(12) United States Patent
Brossier et al.

(10) Patent No.: US 8,032,691 B2
(45) Date of Patent: Oct. 4, 2011

(54) METHOD AND SYSTEM FOR CAPACITY-BALANCING CELLS OF A STORAGE SYSTEM

(75) Inventors: Stephane Brossier, San Fancisco, CA (US); Sacha Christophe Arnoud, San Francisco, CA (US); Shamim P. Mohamed, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 724 days.

(21) Appl. No.: 12/113,269

(22) Filed: May 1, 2008

(65) Prior Publication Data

US 2009/0276598 A1 Nov. 5, 2009

(51) Int. Cl.
*G06F 12/00* (2006.01)
(52) U.S. Cl. ............ 711/103; 711/170; 711/E12.002
(58) Field of Classification Search .......... 711/103, 711/170, 171, E12.002
See application file for complete search history.

(56) References Cited

U.S. PATENT DOCUMENTS

2008/0155175 A1* 6/2008 Sinclair et al. .......... 711/103

OTHER PUBLICATIONS

Sun Microsystems, Inc., Sun Storagetek 5800 System Architecture, Dec. 2007, pp. 1-66.

* cited by examiner

*Primary Examiner* — Pierre-Michel Bataille
(74) *Attorney, Agent, or Firm* — Brooks Kushman P.C.

(57) ABSTRACT

A plurality of cells forming at least a portion of a hive of a data storage system may be capacity balanced by fragmenting a portion of at least one non-empty tile of one of the plurality of cells and moving the fragmented portion to another one of the plurality of cells. A plurality of cells forming at least a portion of a hive of a fixed content storage system may be capacity balanced by identifying at least one of the plurality of cells from which objects are to be moved, and for each of the at least one of the plurality of cells identified, determining a number of objects to be moved to another one of the plurality of cells, identifying one or more tiles that collectively have approximately the number of objects to be moved, and moving the one or more tiles to the another one of the plurality of cells.

20 Claims, 6 Drawing Sheets

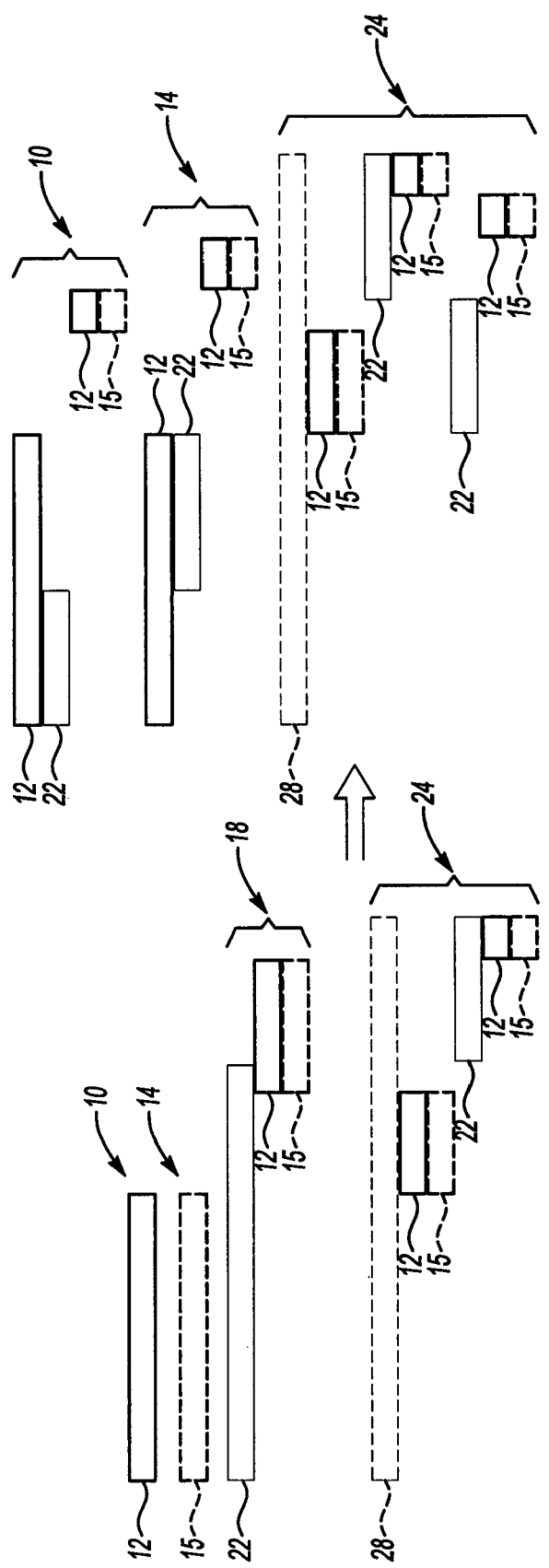

METHOD AND SYSTEM FOR CAPACITY-BALANCING CELLS OF A STORAGE SYSTEM

BACKGROUND

Data types and applications may be classified along two vectors: file versus structured data, and fixed versus dynamic data. Structured dynamic data is typically the data created by relational databases and online transaction processing applications. These applications often run on large servers with either direct attached storage (DAS) disk arrays or storage area network (SAN) disk arrays to store data. Requirements for this type of data may include high throughput, transaction performance and availability, which may be adequately provided by DAS or SAN solutions.

Unstructured dynamic data is usually created by departmental file sharing applications, such as office documents and computer-aided design (CAD). This data has been supported by a variety of storage architectures. Some IT departments, however, are moving to network-attached storage (NAS) systems because they may be easy to deploy, support heterogeneous clients and include advanced data protection features such as snapshot capabilities.

Structured static data created by append-only applications is a relatively new type of data previously served by mainframe and storage archive management solutions. The increasing amount of data associated with digital supply chain, enterprise resource planning (ERP), and radio frequency ID (RFID) applications, however, is creating an opportunity for new approaches to storage.

Unstructured static data (or fixed content), such as digital repositories, medical imaging, broadcast, compliance, media, Internet archives and dark archives, e.g., data that is retained for legal reasons and may be retrieved in the event of a legal dispute, represents a category with fast growing storage requirements. Fixed content may share the long-term storage requirement of structured static data but generally does not change and may require the ability to access the data quickly and frequently, e.g., random reads. Near-line tape may be widely deployed to reduce costs, but are limited in performance and reliability. Large-scale commodity RAID arrays may be economically attractive, unless, for example, added complexity, lack of reliability and limited scalability become evident.

Some characteristics of fixed content, e.g., non-changing data that may be stored long term, yet be quickly and readily accessible, may yield a number of requirements for storage systems:

Data and metadata—to optimally locate and retrieve stored data, the storage system may have the capability to store the files as well as system and user-defined metadata. Metadata describes the content and the attributes for locating the data within the storage system. The system may be optimized to manage different kinds of metadata and queries against the metadata, as well as store data, requiring a separate database. In addition, metadata may be managed so that it may be leveraged to support new data services such as complex queries and data validation.

Data integrity—once written, the data may be protected from accidental damage or intentional tampering and provide assurances that the data is not corrupted or suffering from bit rot over its stored life.

Reliability—the storage system may manage data reliably over the entire lifetime of the data. This may be applicable for large fixed content as these files may be so large that backup and recovery from tape may be too time consuming and thus impractical.

Scalability—the storage system may have the capability to scale from entry-level systems of a few TB to large multi-petabyte (PB) collections, without having to remove and rebuild the data on larger systems. Scalability may be non-disruptive and seamless.

Open architecture—a requirement to archive data for years to decades may mean the data will outlive a number of generations of hardware and software. Open standards may be used to ensure data can migrate across technology generations.

Several conventional technologies may be used in an attempt to meet the above requirements: (i) a DAS or SAN with an application server and metadata database; (ii) a NAS with an application server and metadata database; or (iii) a tape or optical disk with an application server and metadata database. The application servers and metadata databases are used to manage the content-specific functions such as indexing and searching the content.

Conventional solutions may not meet the requirements for unstructured static data. Static unstructured data applications may consume vast amounts of storage, and scale steadily over time. Scaling may create complexity and manageability issues because the process often requires new file systems to be created, clients to be redirected and data to be manually redistributed. NAS systems may be unsuitable because they may be difficult to scale due to the complexity of managing multiple file system mounts.

Another issue with current disk-based solutions may be reliability. For example, large-scale disk-based systems with RAID 5 may not be adequate because of the increasing risk of dual drive failures in a RAID 5 array. Furthermore, in large fixed content systems, the data may not be frequently backed up simply because it is too large. An alternative is to tolerate permanent data loss or implement mirroring schemes that decrease the density and increase the overall cost of a solution.

Tape and optical disks systems are intended for long-term storage, but the access time may be too slow for fixed content application requirements. In addition, fixed content applications may require the data to be always available and on-line, which may reduce the durability of tape or optical disks.

The above solutions may require custom integration of many discrete hardware and software components, as well as application development. Custom solutions may also contribute to complexity and increase management and service costs that surpass the expense of acquiring the technology. The added complexity of databases, application servers, NAS, SAN, volume managers, high availability and hierarchical storage management (HSM) may combine to make these solutions inefficient.

SUMMARY

A method of capacity balancing a plurality of cells forming at least a portion of a hive of a data storage system may include fragmenting a portion of at least one non-empty tile of one of the plurality of cells and moving the fragmented portion to another one of the plurality of cells.

A method of capacity balancing a plurality of cells forming at least a portion of a hive of a fixed content storage system may include identifying at least one of the plurality of cells from which objects are to be moved, and for each of the at least one of the plurality of cells identified, determining a number of objects to be moved to another one of the plurality of cells, identifying one or more tiles that collectively have approximately the number of objects to be moved and moving the one or more tiles to the another one of the plurality of cells.

A system for capacity balancing a plurality of cells forming at least a portion of a hive of a data storage system may include one or more processing units operatively arranged and configured to fragment a portion of at least one non-empty tile from one of the plurality of cells and to move the fragmented portion to another one of the plurality of cells.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 8 is another illustration of a plurality of tiles in a multi-cell hive before and after sloshing.

DETAILED DESCRIPTION

Figure 1:
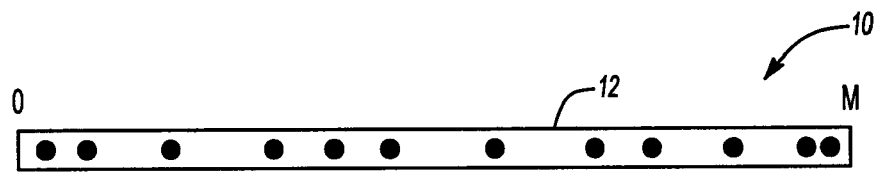
FIG. 1 is an illustration of a tile and its objects in a one-cell hive.

Fixed content aware storage may be a mechanism for storing information that is retrieved based on its content, rather than its storage location, as is the case with typical file systems. Fixed content aware systems may combine low-cost, high-density SATA drives in a clustered system architecture. SATA based systems may be well suited to store fixed content for a number of reasons. First, the systems may use low-cost hardware components such as SATA disks rather than SCSI or FC, and Gigabit Ethernet instead of FC or InfiniBand. Second, the systems may be modular. The clustered design may make it easy to add new storage resources. Third, fixed content aware systems may provide integrated functions, such as integrity and verifiability checking, that are customized to support fixed content applications.

Certain fixed content aware storage systems may include a cluster of nodes in which each node may contain a standard processor, memory, networking and storage. Other configurations, however, are also possible. This design may ensure that as capacity increases, each of the other resources increases in proportion as well. Each node may provide an API and interface that allows all of the storage in the cluster to be accessed. This may be achieved through a system object archive (OA), which implements all of the storage functions as a single image of all nodes with reliability and data integrity protection.

A cell of a fixed content aware storage system may, for example, include 16 storage nodes, 2 Gigabit Ethernet switches and 1 Service Node. Other configurations, however, are also possible. A full-cell configuration may include, for example, 16 storage nodes with 64 500 GB SATA drives. A half-cell configuration may include 8 nodes and 32 drives, etc.

Cells may be combined into a logical unit referred to herein as a hive. Cells of a hive may collectively decide, using any standard election technique, which of the cells will be the "master." As will be apparent to those of ordinary skill, this master may manage certain of the capacity balancing techniques described herein.

All cells may be managed using a single management interface. Multi-cell designs may store, retrieve, query and delete data transparently across multiple cells: the user does not need to know where the objects are stored or from which cells they are retrieved.

A data object may, for example, be stored across seven storage nodes and/or disks using Reed Solomon encoding to break up a data block into five data fragments and two parity fragments. Of course, other suitable encoding and storage techniques may be used. In this example, the system may tolerate up to two missing data or parity fragments for each object. If a disk or a storage node becomes unavailable, the system may re-distribute the data and/or parity to other storage nodes and disks. After a rebuild cycle, the system may tolerate another two missing data and/or parity fragments.

When a request to store a data object comes into the system, a switch, e.g., a Gigabit Ethernet switch, may determine which storage node to direct the request. The selected node may divide the object into fragments and calculate additional parity fragments for resiliency. Any suitable placement algorithm may then decide where to put the pieces. The fragments may then be distributed to the selected nodes as follows:

1. An application issues a store request. A client library initiates an HTTP connection to the data virtual IP address of the cluster.
2. The active Ethernet switch determines which node receives the request and becomes the coordinator for this request. The switch may make this determination by parsing the incoming packet and hashing the source IP port number. The result, for example, may be a number between 1 and 16 which is the node number that the switch forwards all of the packets of this request to. This may effectively spread incoming requests across all of the nodes of the cluster. Because the source port number is used as part of the hash input, each new connection, even if it is from the same host, uses a different source port number, thus spreading the load to other nodes. As apparent to those of ordinary skill, TCP/IP defines requirements for the length of time before a port number can be reused. The system may keep track of the health of the storage nodes. If a node becomes unavailable, the switch may be programmed with an alternate node to receive the requests on behalf of the unavailable node. If another node becomes unavailable, the switch picks a different alternate node.
3. The coordinator receives the request and data. The node that was selected by the Ethernet switch becomes the coordinator for the entire request. The coordinator receives the object to be stored and writes it into temporary storage. A hash, e.g., SHA-1 hash, is computed for the received object contents.
4. The coordinator divides the object into the appropriate sized blocks. Each block is then broken down, for example, into five data fragments for encoding via the Reed-Solomon algorithm. Certain systems may use N=5 fragments and M=2 parity fragments. The two parity fragments may be used to reconstruct up to two missing data fragments.

Additional fragment level checksums may be computed to verify data integrity during later retrieval.

5. The coordinator may execute the object placement algorithm. In this example, the seven data fragments need to be assigned to 7 disks in the system. The placement algorithm determines which 7 out of the 64 total drives in a full cell (or 32 drives in a half cell) are to be used. No two fragments should be placed on the same node, since that would eliminate resiliency for that object. There are approximately 10,000 possible layouts for the data fragments in this example. The algorithm picks a random number between 1 and 10,000 which is the placement identifier. The placement identifier (PI) becomes part of the permanent object identifier (OID.) The PI is then used as a seed for a deterministic pseudo random number generator. The pseudo random number generator, when initialized with the same seed number, returns the same sequence of numbers every time. The generated list of numbers is then masked by the lists of disks that are available at that point in time. This yields the list of disks to assign the fragments to. The placement algorithm may be run on any node of the cluster at any time and may produce identical results given the same starting value, or placement identifier. The algorithm may also be stateless: it does not depend on the results of any prior calculations or state from the rest of the cluster. Additionally, changes in the available disk mask may produce very small changes in the sequence of disks to use.

6. The coordinator distributes fragments to other nodes. The coordinator distributes the seven fragments to the seven nodes that have the selected disks attached. The traffic may flow through the Ethernet switch using the private IP addresses of the nodes. This traffic does not appear on the client network. The internal bandwidth of the Ethernet switch is available for inter-node communications.

Storing an object on certain fixed content aware storage systems discussed herein is an atomic operation. The object should have been completely and reliably stored for the store operation to be considered complete: there are no partial stores. If a store operation is interrupted, the entire operation may discontinue. Once an OID is returned to the application, the object is known to be durable. This may be accomplished without the use of a central transaction coordinator by making use of the synchronous nature of certain file system primitives in the operating system of these fixed content aware storage systems. Avoiding a central transactional coordinator may eliminate a potential bottleneck and may decrease complexity.

The process for retrieving an object may be as follows:

1. The application makes a call to the client library requesting the object by its OID. The client library makes an HTTP connection to the data VIP of the cluster.
2. The Ethernet switch determines which node will be the coordinator for this request and forwards the request packets to that node.
3. The coordinator node extracts the placement ID from the OID, e.g., the random number used by the placement algorithm when the object was originally stored to generate the same sequence of, in this example, seven disks that the five data fragments and two parity fragments are stored on. The sequence is then masked with the list of available disks.
4. Fragments that are stored on available disks or parity fragments, if any of the data fragments are not available, are requested from the nodes that have those disks attached via the private IP addresses of those nodes.
5. The coordinator receives the data and re-assembles the files. If any of the data fragments are missing, the parity fragments are used to reconstruct the missing data fragments using, for example, Reed Solomon. Fragment level checksums may be used to verify that each fragment has been retrieved correctly. If the checksum verification is not successful, the parity fragments may be used to reconstruct the data.
6. The coordinator computes, for example, the SHIA-1 hash of the reassembled object in order to check the integrity of the retrieved data. If the verification succeeds, the file is then streamed back to the client.

If a disk becomes unavailable, some of the fixed content aware storage systems described herein may identify all of the objects that had fragments stored on that disk. In some of the examples discussed thus far, there may be approximately 10,000 possible disk layouts that may be used for storing an object. The placement ID that was assigned to each object when it was stored, in these examples, determines which layout is used by that object. Objects with the same placement ID may share the same layout. A placement algorithm may be used to determine which placement IDs would result in data being stored on the unavailable disk. For each placement ID that is affected, the placement algorithm may indicate which disk should be used to store the reconstructed fragment.

The process of recovering from an unavailable disk may be as follows:

1. Every node in the cell is notified that a disk has become unavailable. There may be a waiting period to ensure the unavailability is not a transient problem, such as a node in the process of rebooting. This may prevent thrashing.
2. Using the process described above, each node in the cell determines if one of its local disks needs to store reconstructed content due to the unavailable disk. All of the nodes may do this in parallel, which speeds up recovery and minimizes the performance impact by spreading the load across the entire cell. Determining the subset of placement IDs that require local reconstruction efficiently partitions the work for each node and prevents duplicated effort. If a node determines that reconstructed data is to be stored on one of its local disks, the node is responsible for rebuilding the data.
3. The list of objects for each affected placement ID is determined. The remaining fragments of each object are retrieved from the other nodes. The Reed Solomon coding algorithm, for example, may then be used to reconstruct the missing fragments.
4. The reconstructed fragments are written out to the selected local disk. Full resiliency for that object is now restored.

Recovering from the unavailability of a node is similar to the process of recovering from an unavailable disk. For example, all of the remaining nodes in the cell may run the recovery process described above. There may be, in some circumstances, up to four times as many placement IDs affected.

Content may be automatically re-distributed when a disk is replaced. The process for redistributing content to a replaced disk may be as follows:

1. When a new disk is inserted into a node, threads that monitor each disk detect it. The disk is first formatted. When the formatting is complete, the disk is mounted.
2. A healing service may determine what content should be on this disk. It may do this by examining the placement ID for each object in the cell. Given a placement ID, a suitable placement algorithm indicates whether this disk should contain a fragment for that object. The list of disks returned by the placement algorithm also indicates which disk should hold the fragment when this disk is unavailable for that particular placement ID.

3. The healing service retrieves the fragment that needs to be relocated from the disk where it is stored and copies it on to the new disk. If for some reason that disk is unavailable, the fragment may be reconstructed. This same process may also be used to support technology upgrades. When additional storage capacity is needed and newer denser disks are supported, an older disk may be replaced. The self healing process may reconstruct the data on the new larger disk.

When a greater amount of storage is required than one cell can provide, additional cells may be added and configured to act as one logical system, e.g., a hive. System administration tools may allow the cells to be managed as one logical system. No changes to the applications are required when a system grows into a multi-cell configuration. The application may only need to be configured with the data virtual IP address of one of the cells. Typically, this may be the data VIP of the first cell.

Cells in a hive configuration may be aware of the existence of other cells, their status, load, configuration, etc. For example, a representative node of each cell in the hive may communicate such information to other cells, i.e., other representative nodes of other cells, in the hive using any suitable protocol.

When an application issues a store request to a cell that is part of a multi-cell system, the client library may transparently retrieve the configuration including the number of cells, the data VIP address for each cell and each cell's current utilization. The client library may then randomly pick two cells from the list. It may then send the storage request to the cell that has the most capacity available. The permanent OID that is assigned when data is stored contains the number of the cell, "c," it is stored on. When a request is made to retrieve an object by its OID, the client library may be able to decode the cell number, c, in order to determine which cell to connect to in order to fetch the object, provided the object has not been moved to another cell.

The client library may also transparently handle searches across a multi-cell hive. The search request is issued to all cells. When the results are returned, the client library may combine the results and return them to the requesting application. Since the client libraries may handle all of the details, the application code and configuration for a multi-cell system may be similar to a single cell system.

For optimal performance, the cells in a hive should be balanced, i.e., all cells in a hive should have approximately the same number of objects. When cells are added or removed from a hive, objects may need to be moved between cells, a process referred to herein as sloshing. Locating a sloshed object given its OID, however, should be fast.

As apparent to those of ordinary skill, an OID is large and OID values may not necessarily be well-distributed in their space. As discussed above, an OID may include a hash of the contents of its associated file as well as other internal system attributes. In certain embodiments, the OID may also include a proxy ID, "s," that, as described below, may be used to find the object associated with the OID. When an object is stored on a cell, s is chosen randomly, using any suitable technique, from an available range. The available range may initially be [0, M), where M is tunable parameter that may be chosen large enough such that the available range is greater than the expected number of objects. The proxy ID along with the cell number (or cell ID), may be part of the OID returned by the system. The s and c values together may provide a well-distributed convenient-sized index for objects. For example, allowing for up to approximately 100 cells and M up to 100,000, (c, s) is approximately 24 bits compared to a 30-byte OID. Note that s values need not be unique. Multiple objects may have the same (c, s) pair.

As discussed above, a cell may comprises any number of nodes, e.g., 32, etc. As described herein, a tile may comprise a set (empty or non-empty) of objects that all have the same c value and some contiguous range of s values.

Referring now to FIG. 1, when a cell 10 is first created, it may have just one tile 12 of size M. As objects (illustrated as dots within the tile) are created, they are distributed randomly (generally uniformly) over the tile 12 because the s values are chosen randomly. In this representation of the tile 12, the horizontal position of each object within the tile 12 is indicative of its s value.

Figure 2:
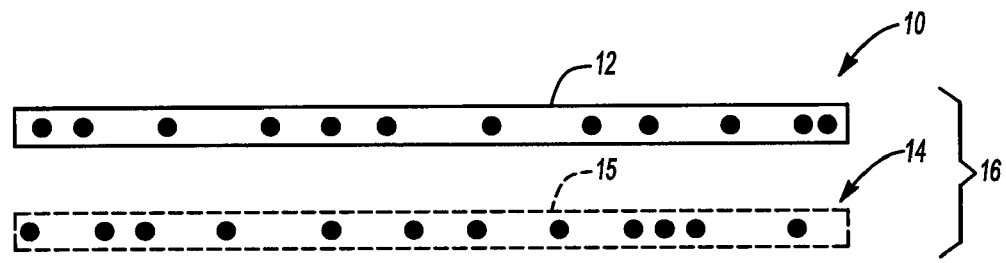
FIG. 2 is an illustration of a plurality of tiles and their objects in a multi-cell hive.

Referring now to FIG. 2, if a non-empty cell 14 having a tile 15 is merged with the cell 10 to form a hive 16, without sloshing, identifying which of the cells 10, 14 an object was stored on may be determined by c because, as discussed above, an object's OID includes c.

Figure 3:
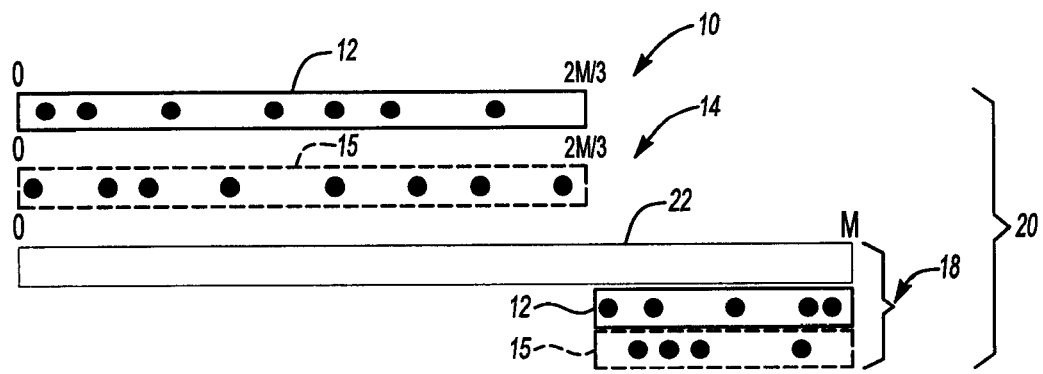
FIG. 3 is an illustration of a plurality of tiles and their objects in a multi-cell hive after sloshing.

Referring now to FIG. 3, an initially empty cell 18 was merged with the cells 10, 14 to form a hive 20. As discussed above, for any tile, objects are randomly (generally uniformly) distributed across it. To achieve capacity balancing between the cells 10, 14, 18, approximately ⅓ of each of the objects in the cells 10, 14 was moved, or sloshed, to the cell 18. To move the objects stored in the cell 10, ⅓ of the tile 12 was fragmented or broken off and moved to the cell 18. To move the objects stored in the cell 14, ⅓ of the tile 15 was fragmented and moved to the cell 18. That is, the objects associated with a ⅓ of a contiguous range of s values of the tile 15 was moved to the cell 18. As discussed above, which ever of the cells 10, 14, 18 is the master of the hive 20 may manage this balancing.

Initially, the cell 18 has a tile 22 of size M. If the cell 18 receives a request to store a new object using the techniques described above, it may choose s values in the range [0, M). If, however, the cell 10 receives a request to store a new object, it may choose s values in the range [0, 2M/3). Similarly, if the cell 14 receives a request to store a new object, it may choose s values in the range [0, 2M/3).

Figure 4:
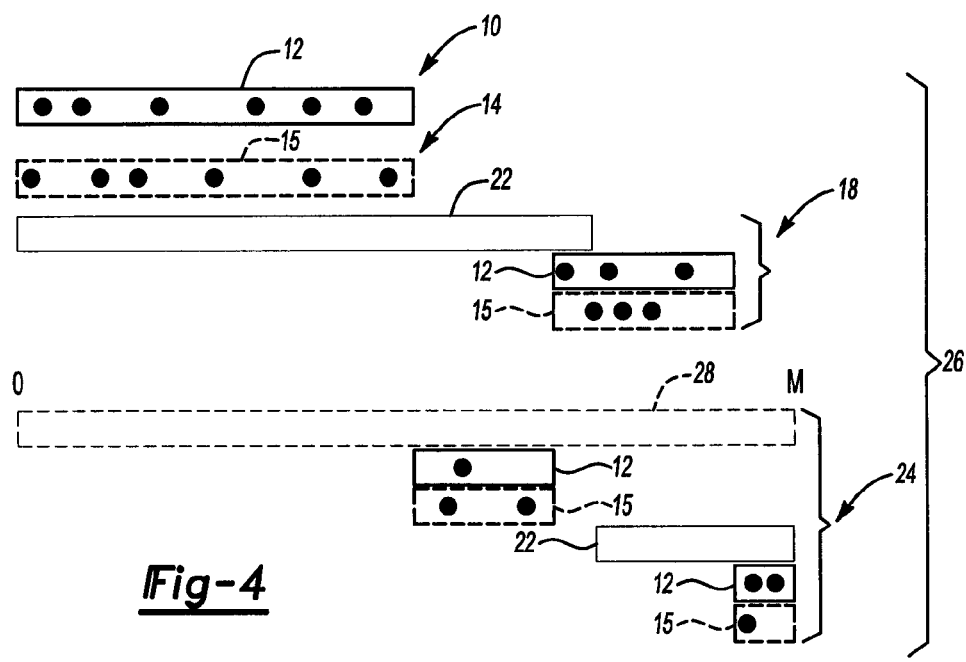
FIG. 4 is another illustration of a plurality of tiles and their objects in a multi-cell hive after sloshing.

Extending the logic discussed above, when adding the k-th cell to a hive
  ∀ old cells d
    ∀ tiles T in d
      fragment rightmost k-th piece of T
      send to new cell Referring now to FIG. 4, an initially empty cell 24 was merged with the cells 10, 14, 18 to from a hive 26. In this example, the cell 18 has three tile portions 12, 15, 22 (tiles 12, 15 were fragmented from cells 10, 14 respectively) and each of the cells 10, 14 have one tile. Using the logic discussed above, the cell 24 received five tile portions, in addition to its own tile portion 28, as a result of sloshing thereby distributing the objects approximately evenly between the cells 10, 14, 18, 24.

If additional objects are stored, the cell 24 may choose s values in the range [0, M). The cells 10, 14, 18, however, may choose s values in a range less than [0, M).

Figure 5:
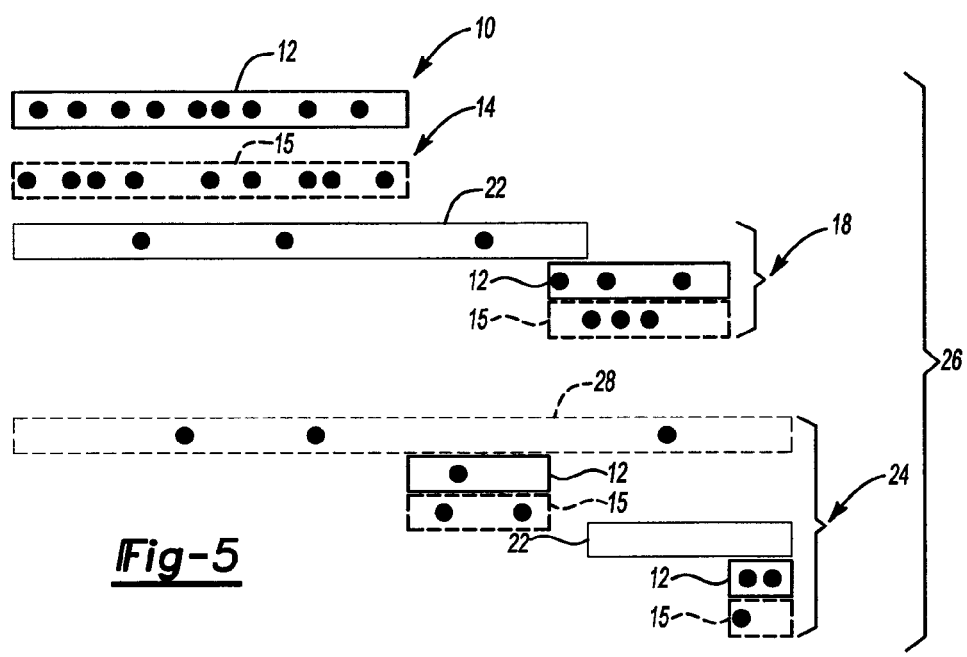
FIG. 5 is an illustration of the plurality of tiles of FIG. 4 including additional objects.

Referring now to FIG. 5, 12 additional objects (3 per cell) have been stored. Note that each of the cells 10, 14, 18, 24 have approximately the same number of objects even though the number of tiles (and the distribution of objects in the tiles) varies.

In other embodiments, the number of objects associated with a tile may be approximated based on the size of its cell because the s values for the tile were originally chosen uniformly within a range. Each cell of the hive may keep a count of the number of objects residing on it using, for example, any suitable technique. For a cell that has only a single tile, the number of objects in that tile is equal to the number of objects in the cell. If this tile is broken in half, for example, the number of objects associated with each piece is approximately equal to ½ the number of objects in the cell. This approximate count of the number of objects is written to each of the pieces. (If a piece is being moved to another cell, the cell number of the another cell is also written to that piece.) Once a piece is moved to another cell, the object count may be incremented as objects are written to the tile. If this tile is to be broken, the number of objects in each of the pieces may be estimated as a fraction of its object count.

To determine the number of objects, N, to be moved from each cell, the total number of objects may be divided by the total number of cells yielding the desired number of objects for each cell after sloshing. The difference between the desired number of objects for each cell and the actual number of objects for each cell prior to sloshing is equal to the number of objects, N, to be moved from each cell. If a group of tiles within a cell collectively contain approximately N objects (or a fraction of one of the tiles contains approximately N objects), those tiles (or fraction of a tile) may be moved to minimize the fragmenting of tiles.

Figure 6:
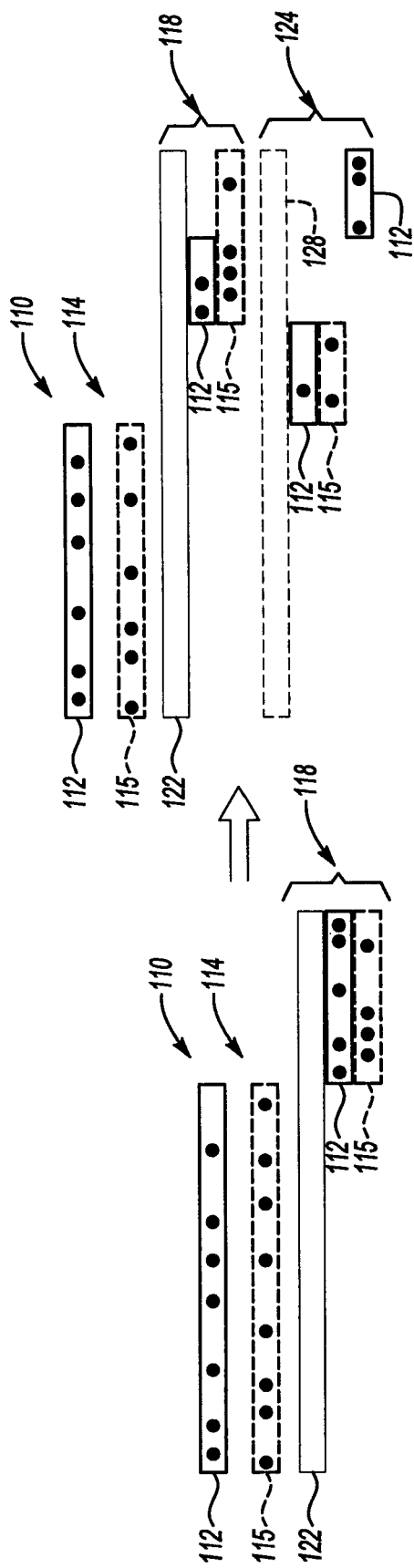
FIG. 6 is an illustration of a plurality of tiles and their objects in a multi-cell hive before and after sloshing.

Referring now to FIG. 6, numbered elements of FIG. 6 that differ by 100 relative to FIGS. 1-5 have similar, although not necessarily identical, descriptions to the numbered elements of FIGS. 1-5. Instead of fragmenting the tiles 112, 115 associated with the cell 118 and sending a quarter of each to the cell 124 during capacity balancing, ½ of the tile 112 associated with the cell 118 was sent to the cell 124. (A quarter of each of the tiles 112, 115 associated with the cells 110, 114 respectively was also sent to the cell 124.)

Sloshing may take a significant amount of time. Data access should not be blocked during sloshing. As such, while a tile is being transferred to another cell, its objects may be on either cell. A client may need to know when sloshing is occurring and maintain both the "before" and "after" view of the system during that time. While sloshing is occurring, if an object is not found on its "before" cell, the "after" cell should be searched.

Recall that in at least some of the embodiments illustrated and discussed herein, the horizontal position of each object within a given tile is indicative of its s value and that the line type and weight of each tile is indicative of the cell in which the tile was initialized. Objects originally stored in the same cell will share the same c value. Also, as described above, each tile carries with it a current cell identifier corresponding to the cell in which it currently resides.

Tiles are not duplicated. Rather, they may be fragmented and/or moved around. That is, when a tile, or portion of a tile, is moved, it retains its horizontal position with reference to the Figures illustrated herein while its vertical position changes. See, e.g., FIGS. 3-6. Given an OID, its associated s and c values may be used to find the cell on which it currently resides.

Figure 7:
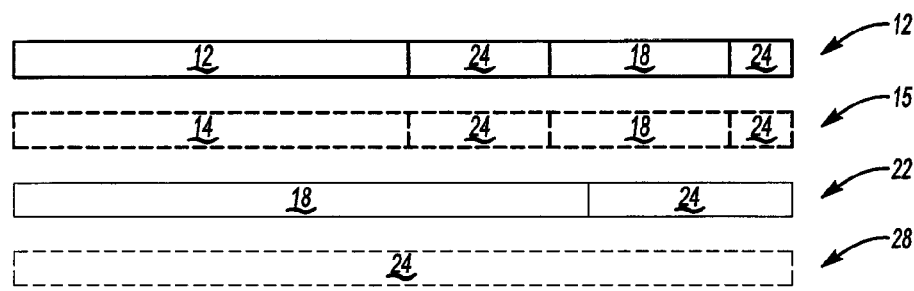
FIG. 7 is another illustration of the plurality of tiles of FIG. 6 after sloshing.

Referring now to FIG. 7, tiles may be grouped by c value (line type and weight) and a binary search used to find the tile (and hence cell via the current cell identifier) containing the desired s value. A client may keep a copy of such an array of tiles. If, for example, the client receives and "object not found" error, the client may refresh their copy of the array.

To decommission a cell, all its non-empty tiles should be distributed among the remaining cells. If there are k cells in a hive and one is being removed, each of its tiles may be fragmented into k−1 segments and distributed among the remaining k−1 cells. Referring to FIG. 8, the tiles 12, 15, 22 within the cell 18 were fragmented as described above and distributed among the cells 10, 14, 24 (objects, illustrated as dots, have been omitted for the purpose of clarity).

In other embodiments, the number of objects associated with each tile (and thus each cell) may be approximated/known as described above. Assuming the number of objects contained by the cell to be decommissioned is H, groups of tiles may be identified that collectively have about H/(k−1) objects. Such groups may be transferred to another cell without fragmenting those tiles (empty tiles may be discarded) thus minimizing fragmentation.

Figure 9:
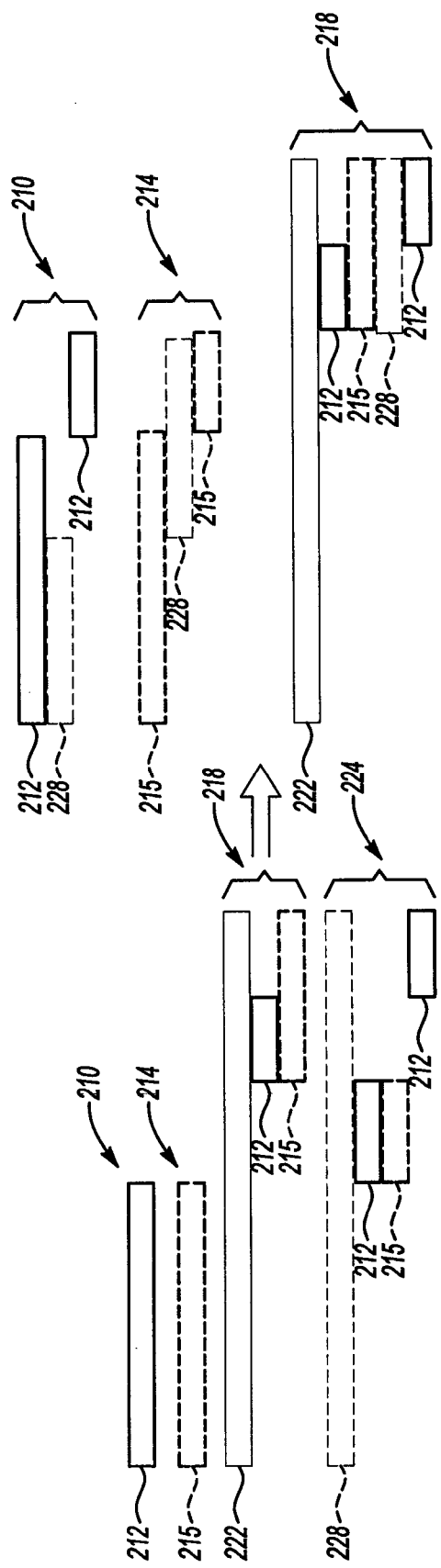
FIG. 9 is yet another illustration of a plurality of tiles in a multi-cell hive before and after sloshing.

Referring now to FIG. 9, numbered elements of FIG. 9 that differ by 200 relative to FIG. 8 have similar, although not necessarily identical, descriptions to the numbered elements of FIG. 8. Assuming that each of the tiles marked as either 212 or 215 and associated with the cell 224 has approximately the same number of objects (as indicated by their similar size), each of these tiles has been moved to one of the cells 210, 214, 218 instead of each being fragmented into 3 pieces and distributed among the cells 210, 214, 218 (objects, illustrated as dots, have been omitted for the purpose of clarity.)

Figure 10:
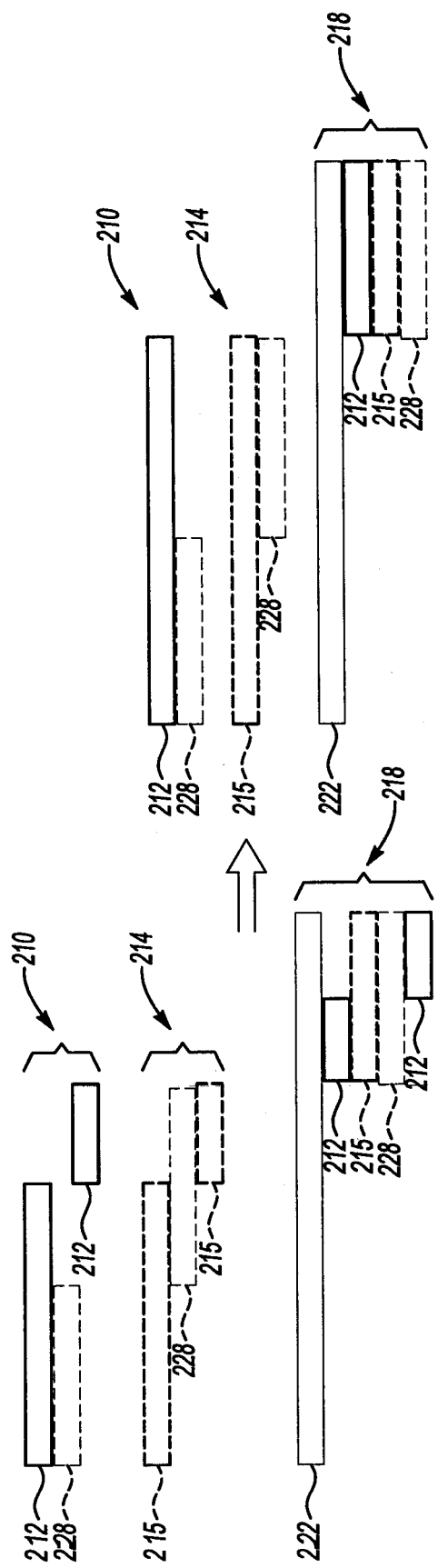
FIG. 10 is an illustration of a plurality of tiles in a multi-cell hive before and after merging tiles.

Tiles within a cell may be combined, or merged, if they share the same c value and the last s value of one of the tiles immediately precedes the first s value of another of the tiles. Referring now to FIG. 10, the tiles 212 associated with the cell 210 may be combined as illustrated, the tiles 215 associated with the cell 214 may be combined as illustrated and the tiles 212 associated with the cell 218 may be combined as illustrated.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for capacity balancing a plurality of cells forming at least a portion of a hive of a data storage system, each of the plurality of cells comprising at least one tile having a size defined by a range of proxy object identification values, the system comprising:

one or more processing units operatively arranged and configured to fragment a portion of at least one non-empty tile from one of the plurality of cells and to move the fragmented portion to another one of the plurality of cells thereby capacity balancing the plurality of cells.

2. The system of claim 1 wherein a plurality of objects are approximately evenly distributed along the range of proxy object identification values of the at least one non-empty tile.

3. The system of claim 1 wherein the fragmented portion includes an object residing at one of the range of proxy object identification values and wherein the one or more processing units are further operatively arranged and configured to locate the object based on its proxy object identification value.

4. The system of claim 1 wherein the another one of the plurality of cells comprises an empty cell.

5. The system of claim 1 wherein the one or more processing units are further operatively arranged and configured to determine a number of objects to be moved from the one of the plurality of cells.

6. A method of capacity balancing a plurality of cells forming at least a portion of a hive of a data storage system, each of the plurality of cells including at least one tile having a size defined by a range of proxy object identification values, the method comprising:

fragmenting a portion of at least one non-empty tile of one of the plurality of cells; and moving the fragmented portion to another one of the plurality of cells thereby capacity balancing the plurality of cells.

7. The method of claim 1 wherein a plurality of objects are approximately evenly distributed along the range of proxy object identification values of the at least one non-empty tile.

8. The method of claim 1 wherein the size of the fragmented portion is based on the number of the plurality of cells.

9. The method of claim 8 wherein the size of the fragmented portion is based on a reciprocal of the number of the plurality of cells.

10. The method of claim 1 wherein the size of the fragmented portion is based on a reciprocal of one less than the number of the plurality of cells.

11. The method of claim 1, wherein the fragmented portion includes an object residing at one of the range of proxy object identification values, further comprising locating the object based on its proxy object identification value.

12. The method of claim 1 wherein the another one of the plurality of cells comprises an empty cell.

13. The method of claim 1 wherein the another one of the plurality of cells comprises a non-empty cell.

14. The method of claim 1 further comprising determining a number of objects to be moved from the one of the plurality of cells.

15. The method of claim 14 wherein the size of the fragmented portion is based on the number of objects to be moved from the one of the plurality of cells.

16. A method of capacity balancing a plurality of cells forming at least a portion of a hive of a fixed content storage system, each of the plurality of cells comprising at least one tile having a size defined by a range of proxy object identification values, at least one of the tiles having a plurality of objects residing at respective proxy object identification values, the method comprising:

identifying at least one of the plurality of cells from which objects are to be moved; and for each of the at least one of the plurality of cells identified
  (i) determining a number of objects to be moved to another one of the plurality of cells,
  (ii) identifying one or more tiles that collectively have approximately the number of objects to be moved, and
  (iii) moving the one or more tiles to the another one of the plurality of cells.

17. The method of claim 16 wherein the number of objects to be moved is based on a total number of objects residing on the at least one of the plurality of cells identified.

18. The method of claim 16 wherein the number of objects to be moved is based on one less than the number of the plurality of cells.

19. The method of claim 16 wherein the another one of the plurality of cells comprises an empty cell.

20. The method of claim 16 wherein the another one of the plurality of cells comprises a non-empty cell.

* * * * *